US012523947B2

(12) United States Patent
Kadowaki

(10) Patent No.: US 12,523,947 B2
(45) Date of Patent: Jan. 13, 2026

(54) IMAGE FORMING DEVICE CAPABLE OF SUPPRESSING TEMPERATURE RISE OF A MEMBER DISPOSED NEAR A FIXING DEVICE

(71) Applicant: SHARP KABUSHIKI KAISHA, Sakai (JP)

(72) Inventor: Hideaki Kadowaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/758,402

(22) Filed: Jun. 28, 2024

(65) Prior Publication Data

US 2025/0028265 A1 Jan. 23, 2025

(30) Foreign Application Priority Data

Jul. 19, 2023 (JP) ................................ 2023-117794

(51) Int. Cl.
*G03G 21/00* (2006.01)
*G03G 15/20* (2006.01)
*G03G 21/20* (2006.01)

(52) U.S. Cl.
CPC ....... *G03G 15/2017* (2013.01); *G03G 21/206* (2013.01); *G03G 2221/1645* (2013.01)

(58) Field of Classification Search
CPC ............. G03G 15/2017; G03G 15/161; G03G 21/168; G03G 21/1652; G03G 21/206; G03G 2215/1661; G03G 2221/1645; G03G 2221/1642
USPC ........................................................... 399/92
See application file for complete search history.

(56) References Cited

U.S. PATENT DOCUMENTS

| | | | | |
|---|---|---|---|---|
| 6,151,466 A * | 11/2000 | Fujiwara | G03G 15/2003 | 399/92 |
| 6,243,550 B1 * | 6/2001 | Fuchiwaki | G03G 15/0173 | 399/92 |
| 2005/0078976 A1 * | 4/2005 | Deguchi | G03G 21/206 | 399/92 |
| 2006/0284960 A1 * | 12/2006 | Kishi | G03G 21/206 | 347/140 |
| 2009/0010672 A1 * | 1/2009 | Watanabe | G03G 21/206 | 399/92 |
| 2011/0249982 A1 * | 10/2011 | Sato | G03G 21/206 | 399/92 |
| 2012/0315061 A1 * | 12/2012 | Kondo | G03G 15/2017 | 399/92 |

(Continued)

FOREIGN PATENT DOCUMENTS

| | | | | |
|---|---|---|---|---|
| EP | 2610689 A2 * | 7/2013 | G03G 15/2017 | |
| JP | H11-065404 A | 3/1999 | | |
| JP | 2015075537 A * | 4/2015 | G03G 15/161 | |

*Primary Examiner* — Robert B Beatty
(74) *Attorney, Agent, or Firm* — ScienBiziP, P.C.

(57) ABSTRACT

An image forming device includes: a fixing device including a heat source that thermally fixes a toner image formed on a sheet P; a cleaning device that holds toner inside and conveys held toner; and a heat shield that shields heat from the fixing device to the cleaning device. The heat shield includes: a ventilation channel, and a duct including a hollow. The heat shield is disposed between the fixing device and the cleaning device disposed to face each other. The cleaning device, the ventilation channel, the duct, and the fixing device are disposed in this order.

6 Claims, 9 Drawing Sheets

(56) References Cited

U.S. PATENT DOCUMENTS

| | | | | |
|---|---|---|---|---|
| 2014/0126926 | A1* | 5/2014 | Takenaga | G03G 21/206 399/92 |
| 2014/0294426 | A1* | 10/2014 | Hata | G03G 21/206 399/92 |
| 2018/0307163 | A1* | 10/2018 | Kishi | G03G 15/2017 |
| 2019/0332053 | A1* | 10/2019 | Kawasumi | G03G 21/206 |

* cited by examiner

IMAGE FORMING DEVICE CAPABLE OF SUPPRESSING TEMPERATURE RISE OF A MEMBER DISPOSED NEAR A FIXING DEVICE

CROSS-REFERENCE TO RELATED APPLICATION

The present application claims priority from Japanese Application JP2023-117794, the content of which is hereby incorporated by reference into this application.

TECHNICAL FIELD

The present disclosure relates to an image forming device including a heat source.

BACKGROUND ART

Image forming devices such as copiers, facsimile machine devices, printers, and multifunctional devices form images on a sheet by forming a toner image on the sheet with a photoconductor drum, and fixing the toner image on the sheet. More specifically, the image is fixed to the sheet by melting with heat the toner in a powder form making up the toner image, and pressuring it with a pressure roller. In addition, the fixing device includes a heater serving as a heat source for the purpose of melting the toner, and as such has a high temperature.

Since toner has the property of melting due to heat, it is preferable to place the device and the like that store the toner at a position away from the fixing device. Specifically, defects occur if the toner melts in these devices other than the fixing device. For example, the development device that forms the toner image on the surface of the photoconductor drum and the cleaning device that collects the waste toner remaining on the surface of the intermediate transfer belt are generally located far enough away from the fixing device to prevent them from being heated.

In recent years, however, as image forming devices have become increasingly compact, the degree of freedom with regard to the placement of each component is decreasing. Therefore, there are cases in which the cleaning device and other components must be placed near the fixing device. In such cases, measures are taken to prevent the inside of the cleaning device from becoming hot due to heat from the fixing device by, for example, placing a heat shielding plate between the fixing device and the cleaning device. However, there is a problem that the heat shielding plate has a small thermal capacity and does not provide sufficient insulation.

In view of this, for example, an image forming device is known that can block the fixing heat of the fixing unit (fixing device) so that it is not transferred to the outside to obtain an even higher insulation effect. In this image forming device, a cooling duct is provided around the fixing unit, and an axial flow fan is attached to its exhaust port such that the axial flow fan is operated to carry air inside the cooling duct and remove heat with air for the purpose of cooling, and further, the axis direction of the axial flow fan is tilted in accordance with the flow direction of the air passing through the exhaust port. In this manner, the reduction in cooling efficiency can be prevented by preventing the reduction in the exhaust efficiency of the cooling duct.

SUMMARY

Technical Problem

The image forming device of PTL 1 has been proposed because providing the heat shielding plate alone cannot achieve sufficient heat insulating effect as described above; however, especially in the case where the image forming device is operated for long periods of time, the amount of heat at the fixing device is large, which raises the temperature inside the duct, and even the image forming device disclosed in PTL 1 cannot sufficiently block the heat.

In view of the above-described problems, an object of the present disclosure is to provide an image forming device that suppresses the temperature rise of the member disposed near the fixing device.

Solution to Problem

An image forming device according to an aspect of the present disclosure is a device that forms an image on a recording medium by forming a toner image on the recording medium and fixing the toner image formed on the recording medium, the image forming device including a fixing device including a heat source that thermally fixes the toner image formed on the recording medium, a toner conveyance device that holds toner inside and conveys held toner, and a heat shield that shields heat from the fixing device to the toner conveyance device, in which the heat shield includes a ventilation channel, and a duct including a hollow, the heat shield is disposed between the fixing device and the toner conveyance device disposed to face each other, and the toner conveyance device, the ventilation channel, the duct, and the fixing device are disposed in this order.

The above-mentioned image forming device includes the heat shield as described above, and thus the heat generated from the fixing device including the heat source is less transferred to the toner conveyance device. In this manner, the temperature rise of the toner conveyance device is suppressed, and the occurrence of a defect in which the toner inside the toner conveyance device is melted can be prevented. Further, since the heat shield includes the ventilation channel and the duct having the hollow, and thus can more reliably inhibit the heat transfer. In addition, since the toner conveyance device is not easily influenced by the heat from the fixing device even with the toner conveyance device disposed near the fixing device that generates heat, there are fewer design constraints, such as disposing the toner conveyance device and the fixing device away from each other, and design flexibility is improved, thus achieving size reduction of the image forming device.

In the above-described image forming device, the toner conveyance device may be detachable from an image forming device body, the image forming device includes a first duct split that may be attached or detached to or from the image forming device body when the image forming device body is attached or detached to or from the toner conveyance device, the first duct split being a part of the duct, the image forming device body may include a second duct split that is a part of the duct, and the duct including the first duct split and the second duct split may be formed when the toner conveyance device is mounted to the image forming device body.

In this manner, the duct including the first duct split and the second duct split is formed by mounting the toner conveyance device to the image forming device body, and thus the temperature rise of the toner conveyance device can be prevented while achieving space-saving.

In the above-described image forming device, the toner conveyance device may be detachable when the toner conveyance device is moved in a horizontal direction with respect to the image forming device body, the first duct split may include a first rib disposed in a vertical direction, a second rib disposed approximately in parallel with respect to the first rib and disposed in the vertical direction, and a bottom surface that couples the first rib and the second rib, the second duct split may include a third rib disposed in the vertical direction, a fourth rib approximately in parallel with the third rib and disposed in the vertical direction, and a ceiling that couples the third rib and the fourth rib, the second rib may be disposed on a side of a direction in which the toner conveyance device is detached from the image forming device body with respect to the first rib, the fourth rib may be disposed on a side of a direction in which the toner conveyance device is detached from the image forming device body with respect to the third rib, the first rib and the fourth rib may be disposed such that the first rib and the fourth rib do not interfere with each other when the toner conveyance device is mounted to the image forming device body, and when the toner conveyance device is mounted to the image forming device body, the first rib and the second rib may be disposed adjacent to the third rib and the fourth rib, respectively, so as to form the duct.

In this manner, the structure in which the duct is formed when the toner conveyance device is mounted to the image forming device body can be achieved with a simple configuration. In addition, since the third rib and the fourth rib serving as parts of the duct are provided in the image forming device body, the strength of the duct is improved.

In the above-described image forming device, the toner conveyance device may be detachable when the toner conveyance device is moved in a horizontal direction with respect to the image forming device body, the first duct split may include a first rib disposed in a vertical direction, a second rib disposed approximately in parallel with respect to the first rib and disposed in the vertical direction, and a bottom surface that couples the first rib and the second rib, the second duct split may include a third rib disposed in the vertical direction, and a ceiling extended from to a side of a direction in which the toner conveyance device is detached from the image forming device body, the second rib may be disposed on a side of a direction in which the toner conveyance device is detached from the image forming device body with respect to the first rib, and when the toner conveyance device is mounted to the image forming device body, the first rib and the second rib may be disposed adjacent to the third rib and the ceiling, respectively, so as to form the duct.

In this manner, the structure in which the duct is formed when the toner conveyance device is mounted to the image forming device body can be achieved with a simple configuration. In addition, since the third rib and the fourth rib serving as parts of the duct are provided in the image forming device body, the strength of the duct is improved.

In the above-described image forming device, the toner conveyance device may be detachable when the toner conveyance device is moved in a horizontal direction with respect to the image forming device body, the first duct split includes a first rib disposed in a vertical direction, a second rib disposed approximately in parallel with respect to the first rib and disposed in the vertical direction, and a bottom surface that couples the first rib and the second rib, the second duct split includes a ceiling extending in the horizontal direction, the second rib may be disposed on a side of a direction in which the toner conveyance device is detached from the image forming device body with respect to the first rib, and when the toner conveyance device is mounted to the image forming device body, the first rib and the second rib may be disposed adjacent to the ceiling so as to form the duct.

In this manner, the structure in which the duct is formed when the toner conveyance device is mounted to the image forming device body can be achieved with a simple configuration. In addition, since the third rib and the fourth rib serving as parts of the duct are provided in the image forming device body, the strength of the duct is improved.

The above-described image forming device may further include an image bearing member configured such that a toner image is formed on a surface, an intermediate transfer belt with an endless form on which a toner image is transferred from the image bearing member to form a toner image on the recording medium. The toner conveyance device may be a cleaning device that removes waste toner remaining on the intermediate transfer belt.

In this manner, even with a configuration in which the cleaning device is disposed near the fixing device, the occurrence of a defect in which the waste toner inside the cleaning device is melted can be prevented. In addition, since the cleaning device can be disposed near the fixing device, the design flexibility is high and size reduction of the image forming device can be achieved.

The above-described image forming device may further include an image bearing member configured such that a toner image is formed on a surface, a development device that supplies toner to the image bearing member to form the toner image on a surface of the image bearing member, and a developer storage device that stores developer containing toner and supplies the developer to the development device, in which the toner conveyance device may be the developer storage device.

In this manner, even with a configuration in which the developer storage device is disposed near the fixing device, the occurrence of a defect in which the toner stored in the developer storage device is melted can be prevented. In addition, since the developer storage device can be disposed near the fixing device, the design flexibility is high and size reduction of the image forming device can be achieved.

Advantageous Effects of Invention

According to the present disclosure, an image forming device that suppresses the temperature rise of the member disposed near the fixing device can be provided.

DESCRIPTION OF EMBODIMENTS

Embodiments according to the present disclosure are described below with reference to the drawings.

First Embodiment

Figure 1:
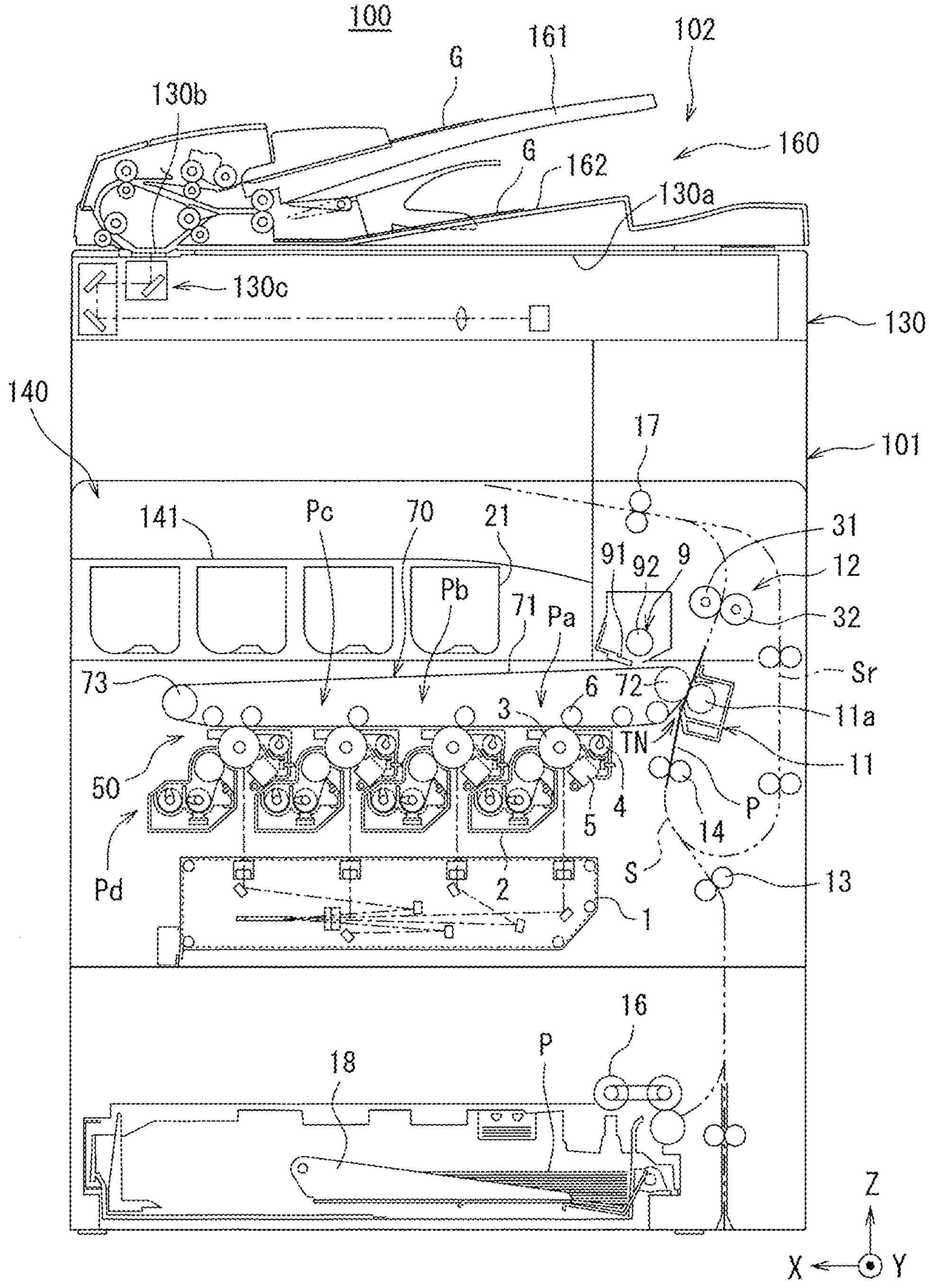
FIG. 1 is a front view illustrating in a see-through manner a schematic configuration of an image forming device according to a first embodiment of the present disclosure.

An image forming device according to a first embodiment of the present disclosure is described with reference to the accompanying drawings. FIG. 1 is a front view illustrating in a see-through manner a schematic configuration of the image forming device according to the first embodiment of the present disclosure.

In the coordinates illustrated in the following drawings, the X-axis direction is the left-right direction (lateral direction) as viewed from the front side of an image forming device 100, and the X-axis positive direction and the X-axis negative direction are the left side and right side, respectively. The Y-axis direction is the depth direction (front-rear direction) orthogonal to the X axis that is the left-right direction, the Y-axis positive direction is the operation side (front surface side), and the Y-axis negative direction is the back side that is the opposite side of the operation side. The Z-axis direction is the up-down direction, i.e., the vertical direction, and the Z-axis positive direction and the Z-axis negative direction are the upper side and the lower side, respectively. Note that in illustrations that do not illustrate the image forming device 100 but illustrate only a component of the image forming device 100, coordinates of a state where the component is mounted in the image forming device 100 are illustrated.

The image forming device 100 is a multifunctional device having a copy function, a scanner function, a facsimile machine function and a printer function, and forms images of document G read with an image reading device 102 or externally received images on a sheet P such as paper in multiple colors or a single color. In addition, the image forming device 100 transmits the image of document G read by the image reading device 102 to the outside.

On the upper side of an image reading unit 130, a document feeding device 160 [automatic document conveyance device (ADF)] that is supported in an openable manner with respect to the image reading unit 130 is provided, and the image reading device 102 includes the document feeding device 160. The document feeding device 160 sequentially conveys one or a plurality of documents G one by one. The image reading device 102 reads the document G that is conveyed one by one by the document feeding device 160 among one or a plurality of the documents G.

The image reading device 102 includes a document mounting stand 130*a*, and has a placed document reading function for reading the document G placed on the document mounting stand 130*a*. In the image forming device 100, when the document feeding device 160 is opened, the document mounting stand 130*a* on the upper side of the image reading unit 130 is opened such that the document G can be manually placed on the document mounting stand 130*a*. In addition, the document feeding device 160 includes a document placement tray 161 for placing the document G, and a document ejection tray 162 for stacking the documents G ejected to the outside.

The image reading device 102 has a conveyed document reading function of reading the document G conveyed by the document feeding device 160. The document feeding device 160 conveys the document G placed on the document placement tray 161 onto a document reading unit 130*b* of the image reading unit 130. The image reading unit 130 generates image data by reading the document G conveyed by the document feeding device 160 or by reading the document placed on the document mounting stand 130*a* through scanning with a scanning optical system 130*c*.

An image forming device body 101 includes an image transfer unit 50, an optical scanning device 1, an intermediate transfer belt device 70, a secondary transfer device 11, a fixing device 12, a sheet conveyance path S, a sheet feeding cassette 18, and a sheet ejection tray 141.

The image forming device 100 handles image data corresponding to color images using black (K), cyan (C), magenta (M), and yellow (Y) colors, or monochrome images using a single color (e.g., black).

The image transfer unit 50 of the image forming device 100 includes four image stations Pa, Pb, Pc, and Pd corresponding to black, cyan, magenta, and yellow colors. Each of the image stations Pa, Pb, Pc, and Pd includes a development device 2, a photoconductor drum 3, a drum cleaning device 4 and a charger 5, and the image stations Pa, Pb, Pc, and Pd form four types of toner images. Specifically, the development device 2, the photoconductor drum 3, the drum cleaning device 4, and the charger 5 are provided four by four, and correspond to black, cyan, magenta, and yellow.

In addition, the image forming device 100 includes toner cartridges 21 corresponding to the four image stations Pa, Pb, Pc, and Pd. The toner cartridges 21 are developer storage devices that store developer containing toner of respective colors, and supply the developer containing toner to the corresponding development devices 2. Note that the toner cartridge 21 is located on the upper side of the development device 2.

The optical scanning device 1 exposes the front surface of the photoconductor drum 3 to form an electrostatic latent image. The development device 2 develops the electrostatic latent image on the front surface of the photoconductor drum 3 to form a toner image on the front surface of the photoconductor drum 3. The drum cleaning device 4 removes and collects residual toner on the front surface of the photoconductor drum 3. The charger 5 uniformly charges a front surface of the photoconductor drum 3 to a predetermined potential. With this series of operations, a toner image of each color is formed on the front surface of each photoconductor drum 3.

The intermediate transfer belt device 70 includes an intermediate transfer roller 6, an endless intermediate transfer belt 71, an intermediate transfer driving roller 72, an intermediate transfer driven roller 73 and a cleaning device 9 (toner conveyance device). The intermediate transfer belt 71 is a rotatable endless belt, and is wound around the intermediate transfer driving roller 72 and the intermediate transfer driven roller 73. Specifically, the intermediate transfer belt 71 is disposed in a stretched state around the intermediate transfer driving roller 72 and the intermediate transfer driven roller 73. Four intermediate transfer rollers 6 are provided inside the intermediate transfer belt 71 so as to form four types of toner images of respective colors. The intermediate transfer roller 6 transfers to the intermediate transfer belt 71 the toner image of each color formed on the surface of the photoconductor drum 3.

The image forming device 100 sequentially transfers the toner image of each color formed on the surface of each photoconductor drum 3 in an overlapping manner to form color toner images on the surface of the intermediate transfer belt 71 disposed in a stretched state around the intermediate transfer driving roller 72 and the intermediate transfer driven roller 73. The toner image formed on the intermediate transfer belt 71 is transferred to the sheet P at the secondary transfer device 11. Then, a part of the toner image formed on the intermediate transfer belt 71 remains on the surface of the intermediate transfer belt 71 as waste toner without being transferred to the sheet P, but this waste toner is removed and collected by the cleaning device 9.

The cleaning device 9 is disposed near the fixing device 12 to remove the waste toner remaining on the surface of the intermediate transfer belt 71. The cleaning device 9 includes a cleaning blade 91 that removes the waste toner remaining on the surface of the intermediate transfer belt 71, and a waste toner conveyance screw 92 that conveys removed waste toner. The cleaning blade 91 is disposed in a fixed manner in contact with the intermediate transfer belt 71, and scrapes off the waste toner remaining on the surface of the intermediate transfer belt 71 when the intermediate transfer belt 71 drives. The waste toner scraped by the cleaning blade 91 off from the surface of the intermediate transfer belt 71 is conveyed by the rotationally driven waste toner conveyance screw 92, and sent to a waste toner storage unit not illustrated in the drawing.

Note that as elaborated later, a heat shield 10 that inhibits heat transfer is disposed adjacent to the cleaning device 9. The heat shield 10 includes a ventilation channel 94 and a duct 93. More specifically, the ventilation channel 94 is disposed to surround the waste toner conveyance screw 92 of the cleaning device 9 (see FIG. 2). With the ventilation channel 94 disposed in this manner, the temperature rise of the waste toner conveyance screw 92 can be prevented even when heat is transferred from the outside. Further, the duct 93 as a hollow is disposed on the fixing device 12 side with respect to the waste toner conveyance screw 92 of the cleaning device 9. Note that the duct 93 has a shape extending along the front-rear direction (the Y-axis direction). In this manner, the temperature rise of the waste toner conveyance screw 92 (the cleaning device 9) can be suppressed by blocking the heat from the fixing device 12.

The secondary transfer device 11 forms a transfer nip region TN between a secondary transfer roller 11*a* and the intermediate transfer belt 71, and conveys the sheet P conveyed through the sheet conveyance path S, by sandwiching the sheet P in the transfer nip region TN. The toner image on the surface of the intermediate transfer belt 71 is transferred to the sheet P when the sheet P passes through the transfer nip region TN, and the sheet P is conveyed to the fixing device 12.

The fixing device 12 includes a fixing roller 31 and a pressure roller 32 that rotate with the sheet P sandwiched therebetween. The fixing device 12 heats and pressurizes the sheet P on which the toner image has been transferred, by sandwiching the sheet P between the fixing roller 31 and the pressure roller 32 so as to fix the toner image onto the sheet P. Although not illustrated in the drawing, a heater serving as a heat source is disposed inside the fixing roller 31, and the surface of the fixing roller 31 that makes contact with the sheet P on which the toner image has been transferred is heated with the heat generated by the heater.

The sheet feeding cassette 18 is a cassette for storing the sheet P for forming images, and is provided on the lower side of the optical scanning device 1. The sheet P is drawn from the sheet feeding cassette 18 by a pick-up roller 16, and conveyed to the sheet conveyance path S. The sheet P conveyed to the sheet conveyance path S is conveyed to an ejection roller 17 via the secondary transfer device 11 and the fixing device 12, and ejected to the sheet ejection tray 141 in an ejection unit 140. In the sheet conveyance path S, a conveyance roller 13, a registration roller 14, and the ejection roller 17 are disposed. The conveyance roller 13 facilitates the conveyance of the sheet P. The registration roller 14 temporarily stops the sheet P to align the leading edge of the sheet P. Further, the registration roller 14 conveys the temporarily stopped sheet P to match with the timing of the color toner image on the intermediate transfer belt 71. The color toner image on the intermediate transfer belt 71 is transferred to the sheet P in the transfer nip region TN between the intermediate transfer belt 71 and the secondary transfer roller 11*a*.

Note that while one sheet feeding cassette 18 is provided in FIG. 1, this is not limitative, and a plurality of the sheet feeding cassettes 18 that store respective sheets P of different types may be provided.

In addition, when forming images not only on the front surface but also on the back surface of the sheet P, the image forming device 100 conveys the sheet P in the opposite direction from the ejection roller 17 to a sheet invert path Sr. The image forming device 100 reverses the front and back of the sheet P conveyed in the opposite direction, and guides it to the registration roller 14 again. In addition, the image forming device 100 forms an image on the back surface of the sheet P guided to the registration roller 14 as on the front surface, and sends it to the sheet ejection tray 141.

Figure 2:
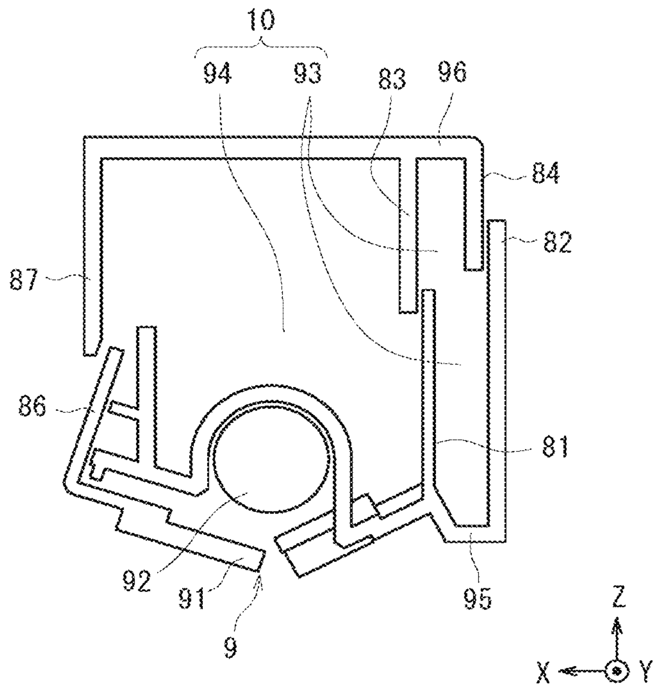
FIG. 2 is a front view illustrating a schematic configuration of a cleaning device and its surroundings in the image forming device according to the first embodiment of the present disclosure.

Next, configurations of the cleaning device 9 and its surroundings are described in detail below with reference to the drawings. FIG. 2 is a front view illustrating a schematic configuration of a cleaning device and its surroundings in the image forming device according to the first embodiment of the present disclosure.

As described above, the cleaning device 9 includes the cleaning blade 91 that scrapes waste toner remaining on the surface of the intermediate transfer belt 71 when the intermediate transfer belt 71 drives, and the waste toner conveyance screw 92 that conveys the scraped waste toner in the direction along the Y axis (front-rear direction). The waste toner conveyance screw 92 conveys the waste toner to the back side (rear side), which is the Y-axis negative direction. Further, an end portion of the waste toner conveyance screw 92 is coupled with the waste toner storage unit (not illustrated), and the waste toner is stored in the storage unit.

Further, as illustrated in FIG. 2, the heat shield 10 is disposed adjacent to the cleaning device 9. The heat shield 10 includes the ventilation channel 94 and the duct 93. Although not illustrated in FIG. 2, the cleaning device 9 is disposed to face the fixing device 12. More specifically, the heat shield 10 (the ventilation channel 94, the duct 93) is disposed between the cleaning device 9 and the fixing device 12. The cleaning device 9, the ventilation channel 94, the duct 93, and the fixing device 12 are disposed in this order (see FIG. 4).

The ventilation channel 94 is formed to surround the waste toner conveyance screw 92. The ventilation channel 94 has a semicircular depression, and the waste toner conveyance screw 92 is configured to fit to the depression. The ventilation channel 94 is a space surrounded by an upper exterior wall rib 87, a third rib 83, a first rib 81, a lower exterior wall rib 86, and the like, and is formed to extend in the direction along the Y axis (front-rear direction). The ventilation channel 94 is supplied with air by a fan not illustrated in the drawing. For example, this air flows from the front surface side (front side), which is the Y-axis positive direction side, to the back side (rear side), which is the Y-axis negative direction side. In this manner, with the ventilation channel 94 disposed as a hollow surrounding the waste toner conveyance screw 92, and the air flowing therethrough, the heat from the fixing device 12 is blocked, and the increase in the temperature in the region around the waste toner conveyance screw 92 is suppressed. In addition, it suffices that with the above-mentioned fan, the ventilation channel 94 takes the air on the outside of the image forming device 100 from the upper part on the front surface side, and carries it to the rear side. By taking the outside air with a temperature relatively lower than the inside of the image forming device body 101 in this manner, the heat shielding effect at the ventilation channel 94 can be improved.

In addition, the ventilation channel 94 is formed on the fixing device 12 side (the X-axis negative direction side) of the duct 93. The duct 93 is a space surrounded by the first rib 81 (first duct split), a bottom surface 95 (first duct split), a second rib 82 (first duct split), a fourth rib 84 (second duct split), a ceiling 96 (second duct split), the third rib 83 (second duct split), and the like, and is formed to extend in the direction along the Y axis (front-rear direction). In this manner, the duct 93 as a hollow and the ventilation channel 94 as a hollow through which air flows are disposed between the fixing device 12 and the waste toner conveyance screw 92, and thus the heat from the fixing device 12 to the waste toner conveyance screw 92 is sufficiently blocked. That is, the temperature rise of the waste toner conveyance screw 92 is sufficiently suppressed.

The third rib 83, the fourth rib 84 and the upper exterior wall rib 87 described above are each configured in a plate shape, extended from the upper side to the lower side, and further extended in the front-rear direction.

In addition, they are fixed to the image forming device body 101. Specifically, the third rib 83, the fourth rib 84, and the upper exterior wall rib 87 are configured in a plate shape approximately parallel to the YZ plane. In addition, the third rib 83 and the fourth rib 84 are coupled by the ceiling 96, and separated by a predetermined distance. In addition, the third rib 83 and the fourth rib 84 have shapes extending from the ceiling 96 toward the lower side, which is the Z-axis negative direction. Note that the ceiling 96 is also fixed to the image forming device body 101.

In addition, the above-described first rib 81 and second rib 82 are configured in a plate shape, extended from the lower side to the upper side, and further extended in the front-rear direction. Specifically, the first rib 81 and the second rib 82 are configured in a plate shape approximately parallel to the YZ plane. In addition, the first rib 81 and second rib 8 are coupled by the bottom surface 95, and are separated by a predetermined distance. In addition, the first rib 81 and the second rib 82 have shapes extended from the bottom surface 95 toward the upper side, which is the Z-axis positive direction. In addition, the lower exterior wall rib 86 is tilted to the first rib 81 and second rib 82, but is also configured in a plate shape, and extended from the lower side to the upper side, further extending in the front-rear direction. Specifically, it is configured in a plate shape tilted to the YZ plane.

The duct 93 is configured with the first rib 81 and the third rib 83, and the second rib 82 and the fourth rib 84 disposed adjacent to one another at the end portions. Note that it suffices that the first rib 81 and the third rib 83, and the second rib 82, and the fourth rib 84 are adjacent to one another as illustrated in FIG. 2, while it is preferable that they be in contact with one another at the end portions. In addition, the ventilation channel 94 is configured with the lower exterior wall rib 86 and the upper exterior wall rib 87, and the first rib 81 and the third rib 83 disposed adjacent to one another at the end portions. Note that it suffices that the lower exterior wall rib 86 and the upper exterior wall rib 87, and the first rib 81 and the third rib 83 are adjacent to one another as illustrated in FIG. 2, while it is preferable that they be in contact with one another at the end portions.

As elaborated later, in the image forming device 100, the intermediate transfer belt device 70 can be detached from the image forming device body 101, but even in such a case, the third rib 83, the fourth rib 84, the ceiling 96, and the upper exterior wall rib 87 are fixed to the image forming device body 101, and do not move. Conversely, when detaching the intermediate transfer belt device 70 from the image forming device body 101, the first rib 81, the second rib 82 and the lower exterior wall rib 86 move together with the intermediate transfer belt device 70 and the cleaning blade 91 provided to the intermediate transfer belt device 70. The state illustrated in FIG. 2 is a state where the intermediate transfer belt device 70 is mounted to the image forming device body 101, and in this case, the duct 93 and the ventilation channel 94 are formed. However, when the intermediate transfer belt device 70 is detached from the image forming device body 101, the duct 93 and the ventilation channel 94 are not formed by being separated.

Figure 3:
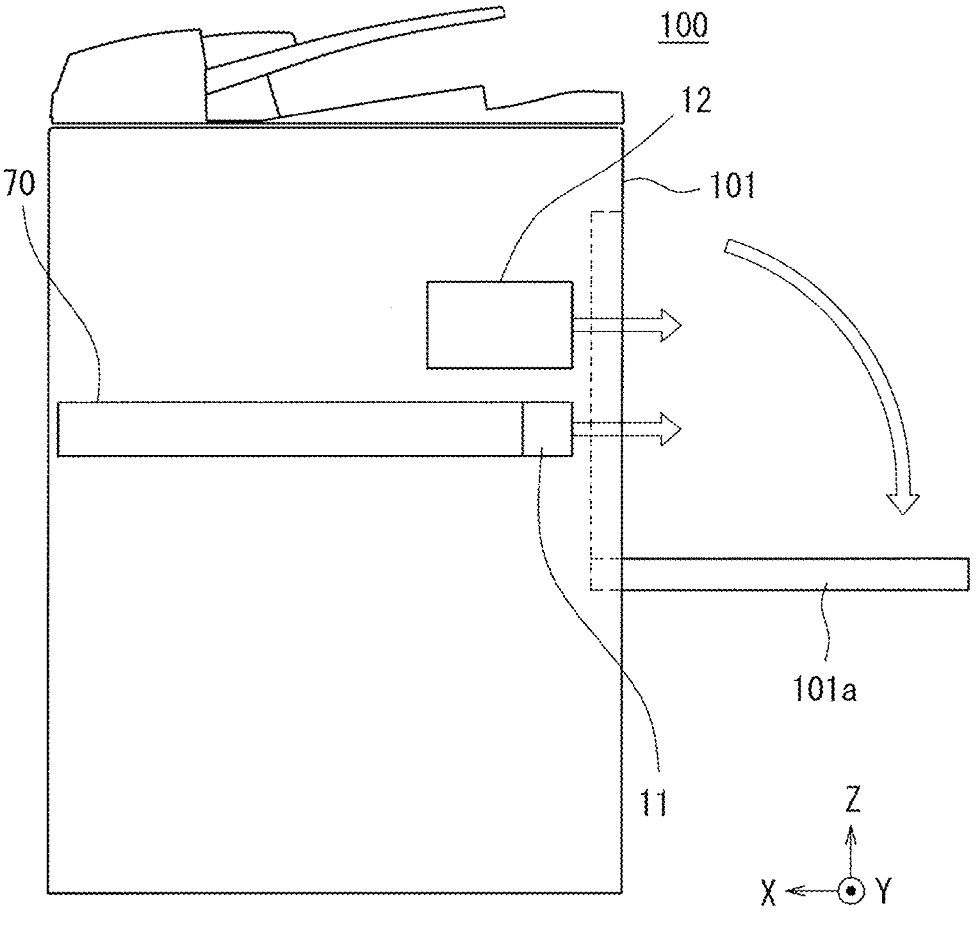
FIG. 3 is a front view for describing a method of detaching a fixing device, a secondary transfer device, and an intermediate transfer belt device in the image forming device according to the first embodiment of the present disclosure.
Figure 4:
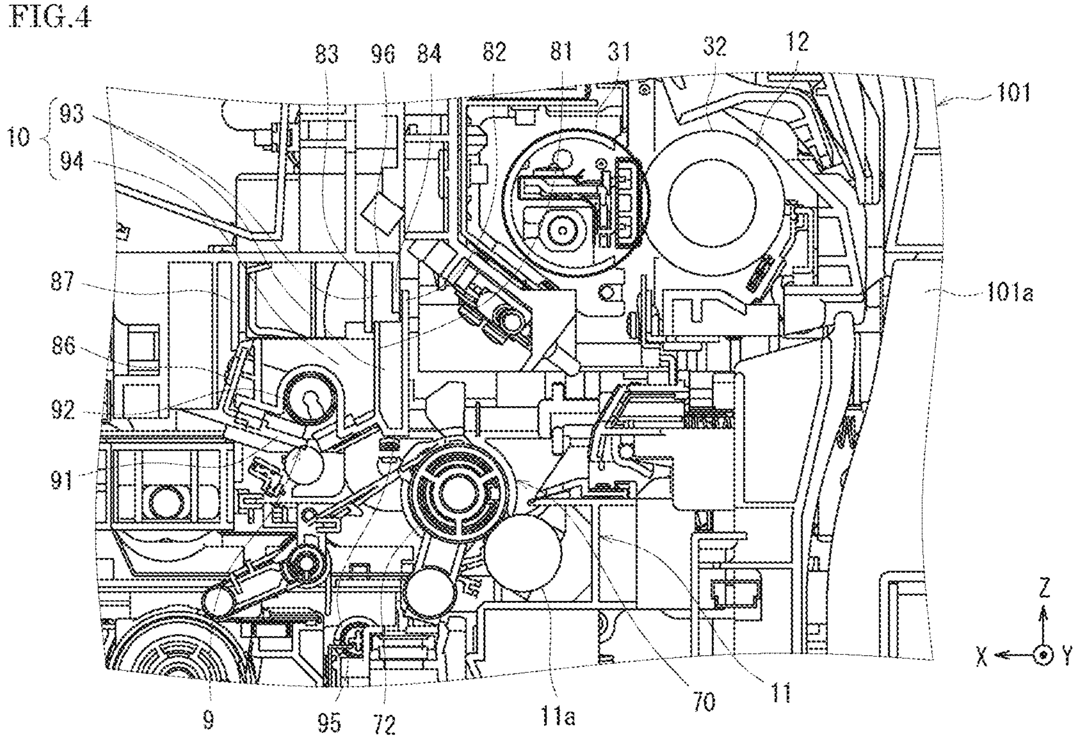
FIG. 4 is a front view illustrating in a see-through manner a configuration in a region around the cleaning device in the image forming device according to the first embodiment of the present disclosure.
Figure 5:
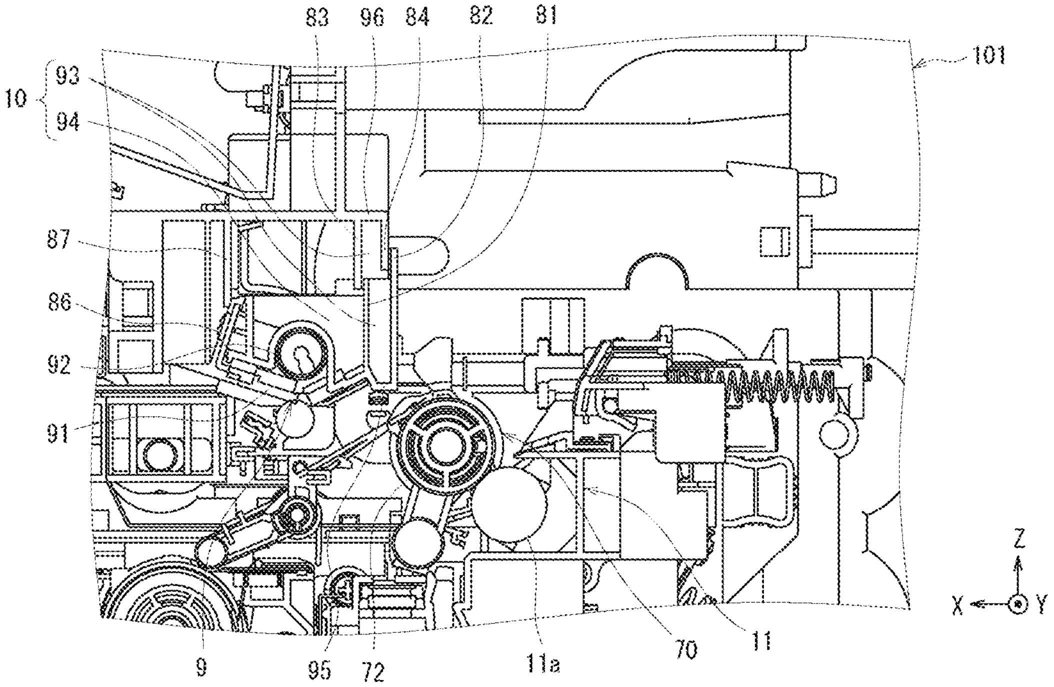
FIG. 5 is a front view illustrating in a see-through manner a configuration in a region around the cleaning device in a state where the fixing device is detached in the image forming device according to the first embodiment of the present disclosure.
Figure 6:
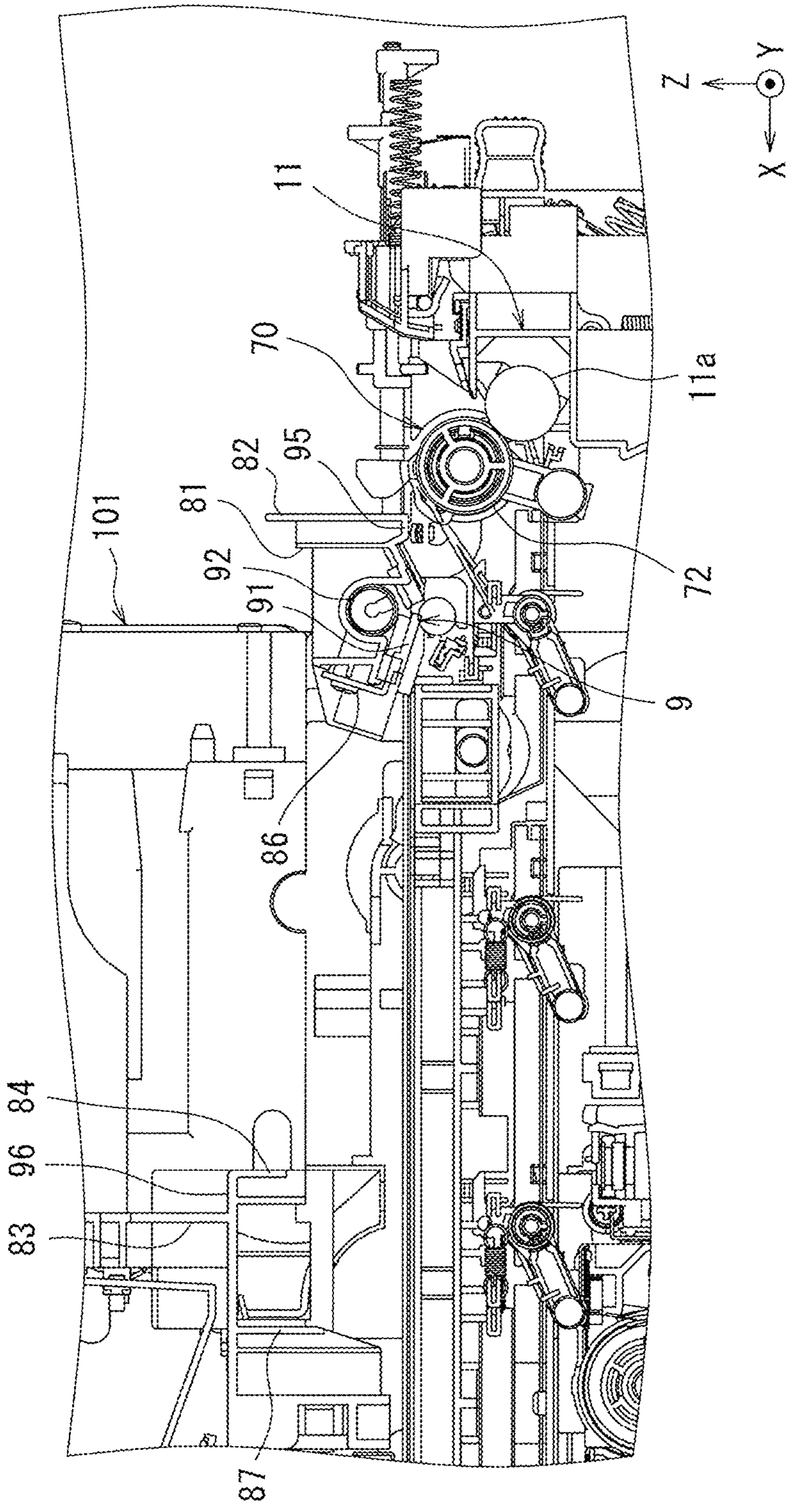
FIG. 6 is a front view illustrating in a see-through manner a configuration of a region around the cleaning device during a process of detaching the intermediate transfer belt device in the image forming device according to the first embodiment of the present disclosure.
Figure 7:
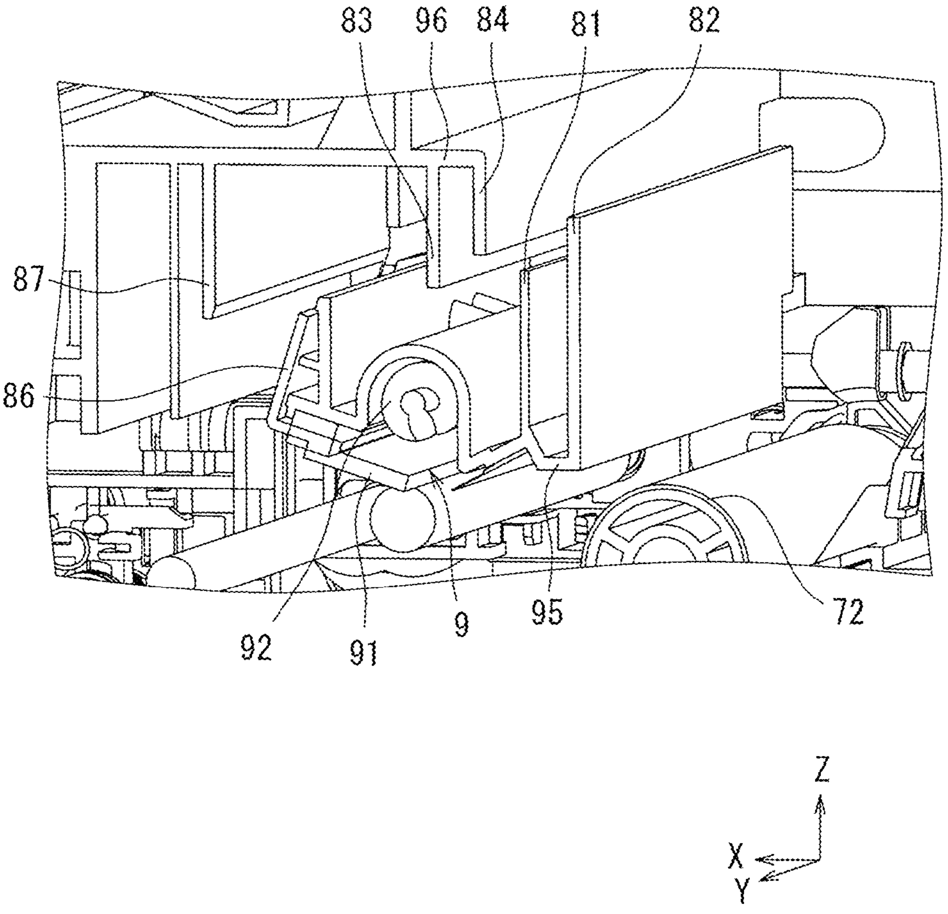
FIG. 7 is a perspective view illustrating in a see-through manner a configuration of a region around the cleaning device during a process of detaching the intermediate transfer belt device in the image forming device according to the first embodiment of the present disclosure.

Next, a procedure of detaching the intermediate transfer belt device 70 from the image forming device body 101 is described with reference to the accompanying drawings. FIG. 3 is a front view for describing a method of detaching a fixing device, a secondary transfer device, and an intermediate transfer belt device in the image forming device according to the first embodiment of the present disclosure. FIG. 4 is a front view illustrating in a see-through manner a configuration in a region around the cleaning device in the image forming device according to the first embodiment of the present disclosure. FIG. 5 is a front view illustrating in a see-through manner a configuration in a region around the cleaning device in a state where the fixing device is detached in the image forming device according to the first embodiment of the present disclosure. FIG. 6 is a front view illustrating in a see-through manner a configuration of a region around the cleaning device during a process of detaching the intermediate transfer belt device in the image forming device according to the first embodiment of the present disclosure. FIG. 7 is a perspective view illustrating in a see-through manner a configuration of a region around the cleaning device during a process of detaching the intermediate transfer belt device in the image forming device according to the first embodiment of the present disclosure.

As illustrated in FIG. 3, an openable body door 101*a* is provided in the right side surface of the image forming device body 101. As illustrated in FIG. 3, the body door

101*a* is openable with the lower end as the rotation axis. When the body door 101*a* is opened, the inside of the image forming device body 101 is exposed, and the fixing device 12, the secondary transfer device 11, and the intermediate transfer belt device 70 disposed inside the image forming device body 101 can be detached from the image forming device body 101 by sliding them in the right side direction (the X-axis negative direction).

Regarding the detaching order, the fixing device 12 can be detached first, and thereafter the secondary transfer device 11 and the intermediate transfer belt device 70 can be detached as one unit. Note that although not illustrated in the drawing, the cleaning device 9 is included in the intermediate transfer belt device 70; however, since the third rib 83, the fourth rib 84, the ceiling 96 and the upper exterior wall rib 87 are fixed to the image forming device body 101 as described above, the third rib 83, the fourth rib 84, the ceiling 96 and the upper exterior wall rib 87 cannot be detached from the image forming device body 101 when detaching the intermediate transfer belt device 70 including the cleaning device 9. It should be noted that when moving the intermediate transfer belt device 70 including the cleaning device 9 to detach or attach them from or to the image forming device body 101, the first rib 81, the second rib 82, the bottom surface 95 and the lower exterior wall rib 86 also move along with the movement.

As illustrated in FIG. 4, in the normal image forming device body 101 before the fixing device 12, the secondary transfer device 11 and the intermediate transfer belt device 70 are detached, the secondary transfer device 11 is disposed on the right side of the intermediate transfer belt device 70 including the cleaning device 9, and the secondary transfer roller 11*a* is disposed near the intermediate transfer driving roller 72. In addition, the fixing device 12 including the fixing roller 31 including inside a heater serving as a heat source is disposed on the upper right side of the cleaning device 9, and the duct 93 and the ventilation channel 94 through which air flows are disposed between the waste toner conveyance screw 92 and the fixing roller 31. With the duct 93 and the ventilation channel 94 as described above, the temperature rise of the waste toner conveyance screw 92 due to the heat generated by the fixing roller 31 is suppressed.

The duct 93 is composed of a hollow formed with the end portions of the first rib 81 and the third rib 83 disposed adjacent to each other, and the end portions of the second rib 82 and the fourth rib 84 disposed adjacent to each other. In addition, the ventilation channel 94 is composed of a hollow formed with the end portions of the first rib 81 and the third rib 83 disposed adjacent to each other, and the end portions of the lower exterior wall rib 86 and the upper exterior wall rib 87 disposed adjacent to each other. Note that with a fan not illustrated in the drawing, air is sent to the ventilation channel 94, and an air flow is generated from the front side to the rear side inside the ventilation channel 94.

When detaching the fixing device 12, the secondary transfer device 11 and the intermediate transfer belt device 70 from the image forming device body 101, the body door 101*a* disposed on the right side of the image forming device body 101 in FIG. 4 is opened. Then, first, the image forming device body 101 is detached by sliding the fixing device 12 to the right side. In this manner, the state illustrated in FIG. 5 is set.

FIG. 5 illustrates a state where the body door 101*a* is opened, and further the fixing device 12 is detached. In this state, when the secondary transfer device 11 and the intermediate transfer belt device 70 as one unit are further slid to the right side, the state illustrated in FIG. 6 is set.

As illustrated in FIG. 6, in the state where the secondary transfer device 11 and the intermediate transfer belt device 70 as one unit are slid to the right side, the third rib 83, the fourth rib 84, the ceiling 96 and the upper exterior wall rib 87 do not move, while the cleaning blade 91, the waste toner conveyance screw 92, the first rib 81, the second rib 82, the bottom surface 95, and the lower exterior wall rib 86 are moved to the right side. Note that the arrangements and lengths in the up-down direction of the first rib 81 and the fourth rib 84 are set to prevent the first rib 81 from interfering with the fourth rib 84 during the above-described movement.

Note that FIG. 7 also illustrates a state where the secondary transfer device 11 and the intermediate transfer belt device 70 as one unit are slid to the right side. It should be noted that in FIG. 7, the amount of sliding of the secondary transfer device 11 and the intermediate transfer belt device 70 to the right side is smaller than in FIG. 6.

In this manner, in the image forming device 100, in the case where the intermediate transfer belt device 70 is mounted to the image forming device body 101, the duct 93 and the ventilation channel 94 serving as the heat shield 10 are formed adjacent to the cleaning device 9, whereas when the intermediate transfer belt device 70 is detached from the image forming device body 101, the duct 93 and the ventilation channel 94 are not formed by being separated.

Note that to set the normal state where the image forming device 100 is operable by mounting to the image forming device body 101 the intermediate transfer belt device 70, the secondary transfer device 11 and the fixing device 12 detached from the image forming device body 101, it is only necessary to perform the reverse process of the above-described detaching process.

Specifically, in the state where the body door 101*a* is opened in the image forming device body 101, the intermediate transfer belt device 70 and the secondary transfer device 11 as one unit are first inserted from the right side (the X-axis negative direction side) of the image forming device body 101, then slid to the left side (the X-axis positive direction side) into the image forming device body 101 (see FIGS. 6 and 7).

When the intermediate transfer belt device 70 is mounted to the image forming device body 101, the duct 93 and the ventilation channel 94 are formed with the first rib 81, the second rib 82 and the lower exterior wall rib 86 disposed adjacent to the third rib 83, the fourth rib 84 and the upper exterior wall rib 87, respectively, fixed to the image forming device body 101 (see FIG. 5). Note that as described above, in view of the sealing property of the duct 93 and the ventilation channel 94, it is preferable that the third rib 83, the fourth rib 84, and the upper exterior wall rib 87 be in contact with the first rib 81, the second rib 82 and the lower exterior wall rib 86, respectively. However, it suffices that the duct 93 and the ventilation channel 94 are formed when the intermediate transfer belt device 70 is mounted to the image forming device body 101 with the third rib 83, the fourth rib 84 and the upper exterior wall rib 87 disposed adjacent to the first rib 81, the second rib 82 and the lower exterior wall rib 86, respectively.

It suffices that after the intermediate transfer belt device 70 and the secondary transfer device 11 are mounted to the image forming device body 101, the fixing device 12 is inserted from the right side (the X-axis negative direction side) of the image forming device body 101 and slid and moved to the left side (the X-axis positive direction side) so as to be mounted in the image forming device body 101, and then the body door 101*a* is closed (see FIG. 4). Thus, mounting of the intermediate transfer belt device 70, the secondary transfer device 11, and the fixing device 12 is completed.

With the image forming device 100 according to the first embodiment, the cleaning device 9 is less influenced by the heat from the fixing device 12 even when the cleaning device 9 is disposed near the fixing device 12 including the heat source because the duct 93 and the ventilation channel 94 are provided as described above. Therefore, the occurrence of a defect in which the waste toner removed by the cleaning device 9 from the intermediate transfer belt 71 is melted by the heat inside the cleaning device 9 can be prevented.

In addition, it is not necessary to dispose the cleaning device 9 at a position separated away from the fixing device 12 because it is not easily influenced by the heat from the fixing device 12 even when disposed near the fixing device 12, thus improving the design flexibility and achieving the space-saving of the image forming device 100. In addition, since the duct 93 and the ventilation channel 94 are composed of a plurality of members, and the duct 93 and the ventilation channel 94 are formed when the intermediate transfer belt device 70 is mounted to the image forming device body 101, the design flexibility is further improved.

In addition, since the duct 93 is provided, sufficient heat insulating effect can be achieved even when the amount of air to be sent into the ventilation channel 94 is reduced. Therefore, the operation of the fan for sending air into the ventilation channel can be reduced.

In addition, since the third rib 83 and the fourth rib 84 fixed to the image forming device body 101 are a part of the components of the duct 93 and the ventilation channel 94, the duct 93 and the ventilation channel 94 advantageously have high strength.

Second Embodiment

An image forming device according to a second embodiment of the present disclosure is different from the image forming device 100 according to the first embodiment in the members making up the duct 93 and the ventilation channel 94, but other configurations are the same as those of the image forming device 100 according to the first embodiment. In view of this, differences from the first embodiment are described below. In addition, the same members as those of the first embodiment are denoted with the same reference numerals, and the description thereof is omitted.

Figure 8:
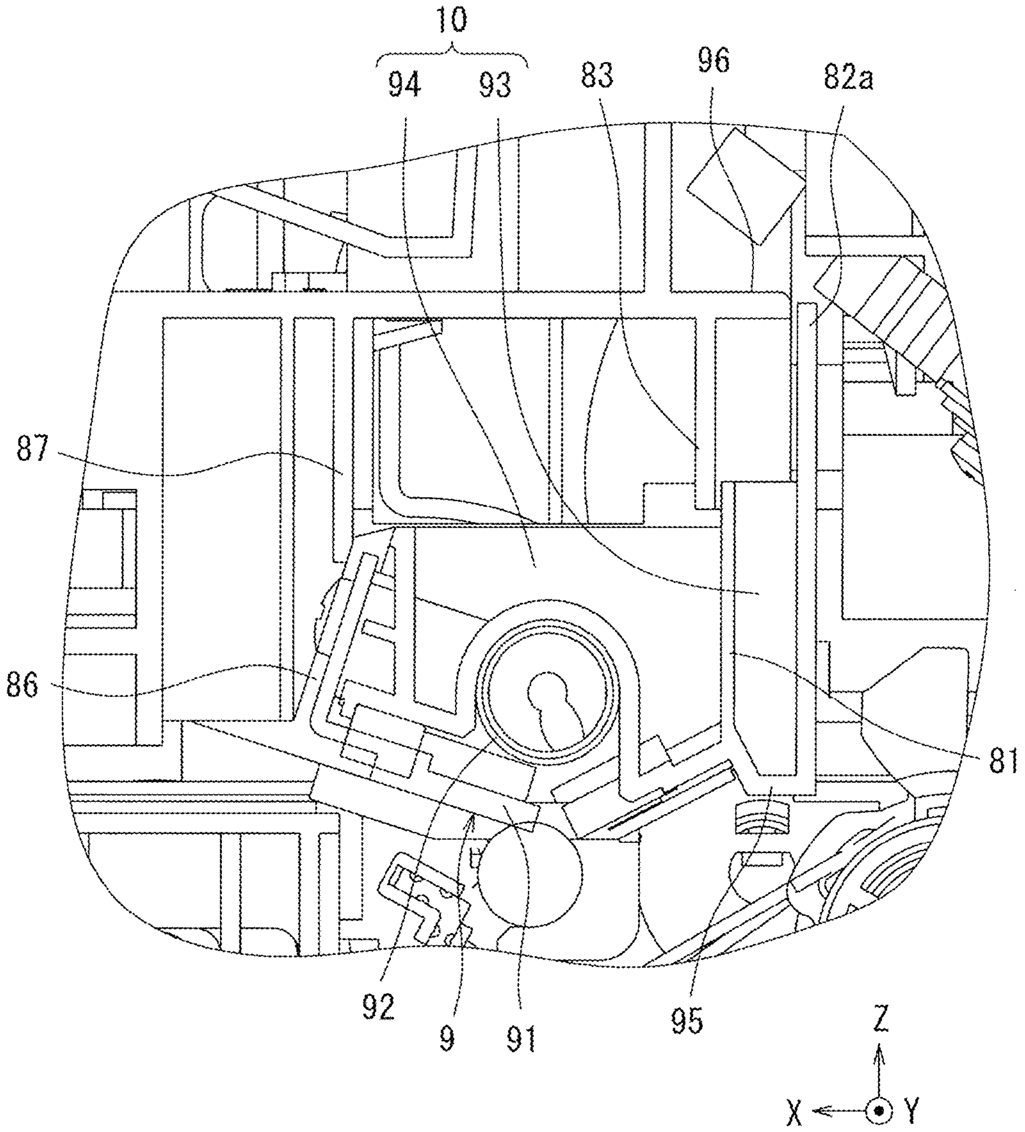
FIG. 8 is a front view illustrating in a see-through manner a configuration of a cleaning device and its surroundings in an image forming device according to a second embodiment of the present disclosure.

The image forming device according to the second embodiment of the present disclosure is described below with reference to the accompanying drawings. FIG. 8 is a front view illustrating in a see-through manner a configuration of a cleaning device and its surroundings in the image forming device according to the second embodiment of the present disclosure.

As illustrated in FIG. 8, in the second embodiment, the fourth rib 84, which is provided in the first embodiment, is not provided. In addition, the second rib 82*a* that is coupled with the first rib 81 by the bottom surface 95 is extended to the upper side and disposed adjacent to the right end portion of the ceiling 96. With such a configuration, the duct 93 includes the first rib 81, the bottom surface 95, the second rib 82*a*, the ceiling 96, and the third rib 83.

Third Embodiment

An image forming device according to a third embodiment of the present disclosure is different from the image forming device 100 according to the first embodiment in the members making up the duct 93 and the ventilation channel 94, but other configurations are the same as those of the image forming device 100 according to the first embodiment. In view of this, differences from the first embodiment are described below. In addition, the same members as those of the first embodiment are denoted with the same reference numerals, and the description thereof is omitted.

Figure 9:
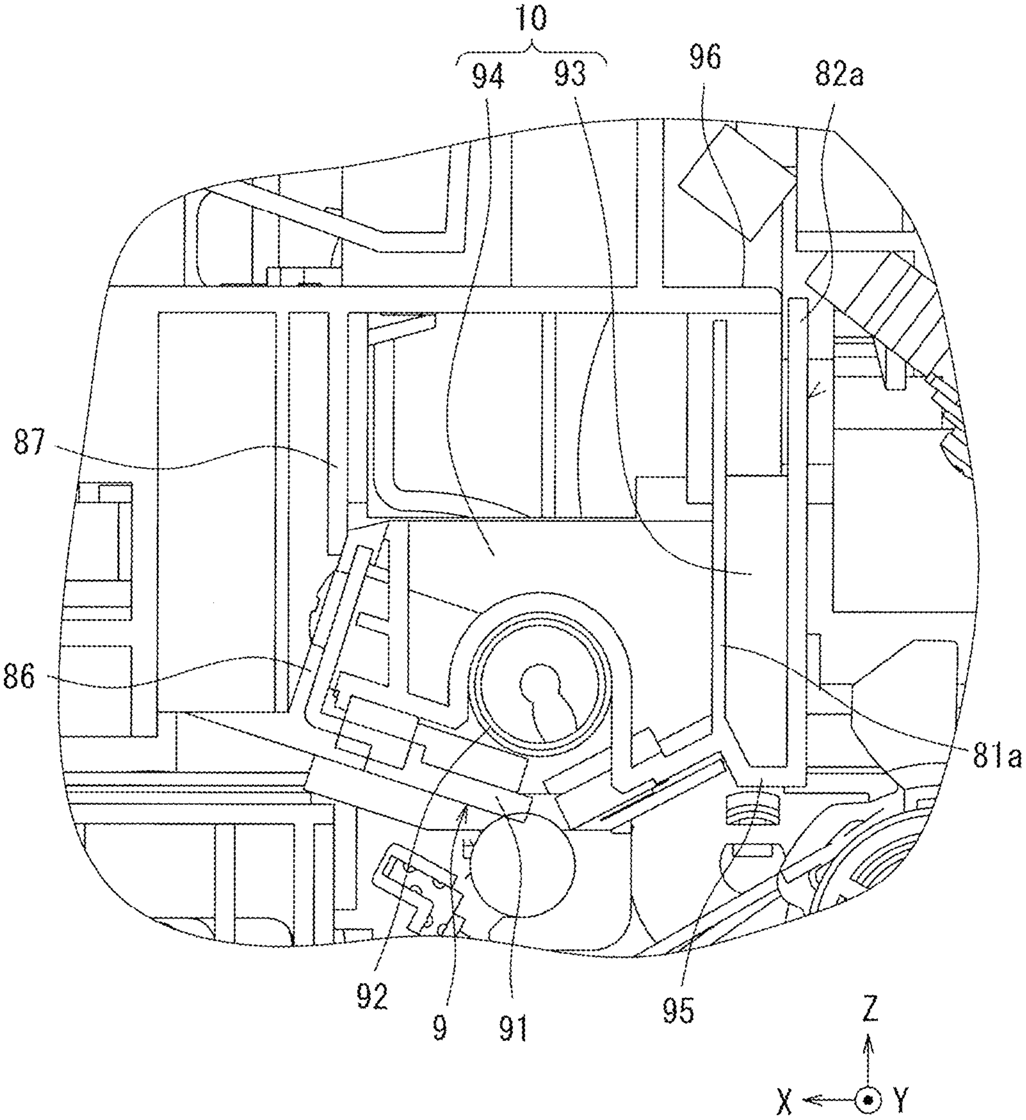
FIG. 9 is a front view illustrating in a see-through manner a configuration of a cleaning device and its surroundings in an image forming device according to a third embodiment of the present disclosure.

The image forming device according to the third embodiment of the present disclosure is described below with reference to the accompanying drawings. FIG. 9 is a front view illustrating in a see-through manner a configuration of a cleaning device and its surroundings in the image forming device according to the third embodiment of the present disclosure.

As illustrated in FIG. 9, in the third embodiment, the third rib 83 and the fourth rib 84, which are provided in the first embodiment, are not provided. In addition, the first rib 81*a* and the second rib 82*a* coupled by the bottom surface 95 and extended to the upper side are each extended to the upper side and disposed adjacent to the bottom surface part and right end portion of the ceiling 96. With such a configuration, the duct 93 includes the first rib 81*a*, the bottom surface 95, the second rib 82*a*, and the ceiling 96.

As described above, with the image forming device 100 according to the present embodiments 1 to 3, the cleaning device 9 is less influenced by the heat from the fixing device 12 even when the cleaning device 9 is disposed near the fixing device 12 that includes the heat source because the duct 93 and the ventilation channel 94, serving as the heat shield 10, are provided. Therefore, the occurrence of a defect, in which the waste toner removed by the cleaning device 9 from the intermediate transfer belt 71 is melted by the heat inside the cleaning device 9, can be prevented. Thus, it is not necessary to dispose the cleaning device 9 at a position separated away from the fixing device 12, and the design flexibility is improved, thus achieving the space-saving of the image forming device 100. In addition, since the duct 93 and the ventilation channel 94 are composed of a plurality of members, and the duct 93 and the ventilation channel 94 are formed when the intermediate transfer belt device 70 is mounted to the image forming device body 101, the design flexibility is further improved.

In addition, in the image forming device 100 according to the present embodiments 1 to 3, the duct 93 and the ventilation channel 94, serving as the heat shield 10, are provided between the cleaning device 9 and the fixing device 12, but in the case of a configuration in which the fixing device 12 is disposed near a device that conveys toner stored inside other than the cleaning device 9, it suffices that the duct 93 and the ventilation channel 94 are provided between them. For example, in the image forming device 100, in the case where the cleaning device 9 is located near the intermediate transfer driven roller 73 instead of the configuration illustrated in FIG. 1, the toner cartridge 21 (toner conveyance device) may be extended to the fixing device 12 side and the toner cartridge 21 may be disposed near the fixing device 12 for the purpose of increasing the capacity of the toner cartridge 21 or the like. In such a case, it suffices that the duct 93 and the ventilation channel 94 are provided between the fixing device 12 and the toner cartridge 21.

The present disclosure is not limited to the embodiments described above and can be implemented in various other forms. Thus, the above embodiments are merely examples in all respects and should not be interpreted as limiting. The scope of the disclosure is indicated by the claims and is not limited to the description. Furthermore, all modifications and changes equivalent in scope to the claims are included in the scope of the disclosure.

The invention claimed is:

1. An image forming device that forms an image on a recording medium by forming a toner image on the recording medium and fixing the toner image formed on the recording medium, the image forming device comprising:
 an image forming device body;
 a fixing device including a heat source that thermally fixes the toner image formed on the recording medium;
 a toner conveyance device that conveys toner; and
 a heat shield that shields the toner conveyance device from heat generated by the fixing device, wherein
 the heat shield includes:
  a ventilation channel, and
  a duct including a hollow,
 the heat shield is disposed between the fixing device and the toner conveyance device that are disposed to face each other,
 the toner conveyance device, the ventilation channel, the duct, and the fixing device are disposed in this stated order,
 the toner conveyance device is detachable from the image forming device body,
 the image forming device includes a first duct split that is attached to or detached from the image forming device body when the toner conveyance device is attached to or detached from the image forming device body, the first duct split being a part of the duct,
 the image forming device body includes a second duct split that is another part of the duct, and
 the duct including the first duct split and the second duct split is formed when the toner conveyance device is mounted to the image forming device body.

2. The image forming device according to claim 1, wherein
 the toner conveyance device is detachable when the toner conveyance device is moved in a horizontal direction with respect to the image forming device body,
 the first duct split includes;
  a first rib disposed in a vertical direction,
  a second rib disposed approximately in parallel with respect to the first rib and disposed in the vertical direction, and
  a bottom surface that couples the first rib and the second rib,
 the second duct split includes:
  a third rib disposed in the vertical direction,
  a fourth rib approximately in parallel with the third rib and disposed in the vertical direction, and
  a ceiling that couples the third rib and the fourth rib,
 the second rib is disposed on a side of a direction in which the toner conveyance device is detached from the image forming device body with respect to the first rib,
 the fourth rib is disposed on another side of the direction in which the toner conveyance device is detached from the image forming device body with respect to the third rib,
 the first rib and the fourth rib are disposed, such that not to interfere with each other when the toner conveyance device is mounted on the image forming device body, and
 when the toner conveyance device is mounted on the image forming device body, the first rib and the second rib are disposed adjacent to the third rib and the fourth rib, respectively, so as to form the duct.

3. The image forming device according to claim 1, wherein
 the toner conveyance device is detachable when the toner conveyance device is moved in a horizontal direction with respect to the image forming device body,
 the first duct split includes:
  a first rib disposed in a vertical direction,
  a second rib disposed approximately in parallel with respect to the first rib and disposed in the vertical direction, and
  a bottom surface that couples the first rib and the second rib,
 the second duct split includes:
  a third rib disposed in the vertical direction, and
  a ceiling extended from to a side of a direction in which the toner conveyance device is detached from the image forming device body,
 the second rib is disposed on the side of the direction in which the toner conveyance device is detached from the image forming device body with respect to the first rib, and
 when the toner conveyance device is mounted to the image forming device body, the first rib and the second rib are disposed adjacent to the third rib and the ceiling, respectively, so as to form the duct.

4. The image forming device according to claim 1, wherein
 the toner conveyance device is detachable when the toner conveyance device is moved in a horizontal direction with respect to the image forming device body,
 the first duct split includes:
  a first rib disposed in a vertical direction,
  a second rib disposed approximately in parallel with respect to the first rib and disposed in the vertical direction, and
  a bottom surface that couples the first rib and the second rib,
 the second duct split includes a ceiling extending in the horizontal direction,
 the second rib is disposed on a side of a direction in which the toner conveyance device is detached from the image forming device body with respect to the first rib, and
 when the toner conveyance device is mounted on the image forming device body, the first rib and the second rib are disposed adjacent to the ceiling so as to form the duct.

5. The image forming device according to claim 1, further comprising:
 an image bearing member configured, such that a toner image is formed on a surface;
 an intermediate transfer belt with an endless form on which the toner image is transferred from the image bearing member to form the toner image on the recording medium; and
 a cleaning device that conveys waste toner remaining on the intermediate transfer belt to a waste toner storage unit, wherein
 the toner conveyance device is provided as a part of the cleaning device.

6. The image forming device according to claim 1, further comprising:
 an image bearing member configured, such that a toner image is formed on a surface;
 a development device that supplies toner to the image bearing member to form the toner image on the surface of the image bearing member; and a developer storage device that stores developer containing toner and supplies the developer containing toner to the development device, wherein the toner conveyance device is provided as a part of the developer storage device.

* * * * *